Figure 1:
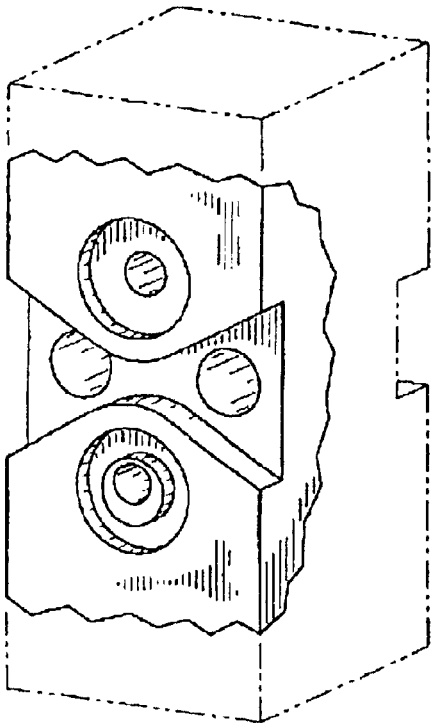

US00RE42029E

(19) United States
(12) Reissued Patent
Raterman et al.

(10) Patent Number: US RE42,029 E
(45) Date of Reissued Patent: Jan. 18, 2011

(54) INTAKE PORTION OF A LIQUID DISPENSING VALVE

(75) Inventors: John M. Raterman, Atlanta, GA (US); Christopher R. Chastine, Hoschton, GA (US)

(73) Assignee: Nordson Corporation, Westlake, OH (US)

(21) Appl. No.: 29/297,729

(22) Filed: Nov. 16, 2007

Related U.S. Patent Documents

Reissue of:
(64) Patent No.: Des. 536,421
Issued: Feb. 6, 2007
Appl. No.: 29/202,811
Filed: Apr. 2, 2004

(51) LOC (9) Cl. ..... 13 03
(52) U.S. Cl. ..... D23/233; D15/28
(58) Field of Classification Search ..... D23/233
See application file for complete search history.

(56) References Cited

U.S. PATENT DOCUMENTS

| | | | | |
|---|---|---|---|---|
| 3,115,282 | A | | 12/1963 | McKenzie |
| 3,612,069 | A | | 10/1971 | Waters |
| RE27,865 | E | | 1/1974 | Baker et al. |
| 3,851,801 | A | | 12/1974 | Roth |
| D281,168 | S | | 10/1985 | Scholl et al. |
| 4,549,866 | A | | 10/1985 | Granville |
| 4,579,309 | A | | 4/1986 | Fujiwara et al. |
| 4,600,128 | A | | 7/1986 | Rohrer |
| 4,653,199 | A | | 3/1987 | McLeod et al. |
| 4,688,609 | A | | 8/1987 | Diaz |
| 4,874,014 | A | | 10/1989 | Grant et al. |
| 5,000,112 | A | | 3/1991 | Rothen et al. |
| 5,063,790 | A | | 11/1991 | Freeman et al. |
| 5,265,800 | A | | 11/1993 | Ziecker et al. |
| 5,356,038 | A | | 10/1994 | Banks |
| 5,375,738 | A | | 12/1994 | Walsh et al. |
| 5,478,224 | A | | 12/1995 | McGuffey |
| 5,683,037 | A | | 11/1997 | Rochman et al. |
| D401,600 | S | | 11/1998 | Byerly et al. |
| D404,464 | S | * | 1/1999 | Niemczyk ..... D23/233 |
| 5,915,625 | A | | 6/1999 | Focke et al. |
| 6,056,155 | A | | 5/2000 | Byerly et al. |
| 6,089,413 | A | | 7/2000 | Riney et al. |
| D429,263 | S | | 8/2000 | Auber et al. |
| 6,105,832 | A | | 8/2000 | Beck |
| 6,123,302 | A | | 9/2000 | Taylor |
| 6,216,903 | B1 | | 4/2001 | Hirose et al. |
| 6,244,522 | B1 | | 6/2001 | Reighard et al. |
| 6,260,583 | B1 | | 7/2001 | Flatt et al. |
| 6,286,721 | B1 | | 9/2001 | Pellegrini |
| 6,354,463 | B1 | | 3/2002 | Pahl |
| 6,358,322 | B1 | | 3/2002 | Pahl |
| D456,427 | S | | 4/2002 | Gressett, Jr. et al. |
| 6,406,625 | B1 | | 6/2002 | Brock et al. |
| D460,092 | S | | 7/2002 | Gressett, Jr. et al. |
| D460,148 | S | * | 7/2002 | Hayashi et al. ..... D23/233 |
| 6,435,425 | B1 | | 8/2002 | Saidman |
| D470,221 | S | * | 2/2003 | Niemczyk ..... D23/233 |
| 6,572,033 | B1 | | 6/2003 | Pullagura et al. |
| 6,601,741 | B2 | | 8/2003 | McGuffey |
| 6,669,057 | B2 | | 12/2003 | Saidman et al. |
| D494,658 | S | * | 8/2004 | Kobayashi et al. ..... D23/233 |
| D505,183 | S | * | 5/2005 | Fukuda et al. ..... D23/233 |
| 6,931,205 | B2 | | 8/2005 | Atkins |
| D515,177 | S | | 2/2006 | Raterman et al. |
| 7,082,262 | B2 | | 7/2006 | Clark et al. |
| D536,421 | S | | 2/2007 | Raterman et al. |
| 7,296,706 | B2 | | 11/2007 | Raterman et al. |
| 2003/0080155 | A1 | | 5/2003 | Jeter |
| 2003/0192292 | A1 | | 10/2003 | Seedorf |
| 2003/0200921 | A1 | | 10/2003 | Crane et al. |
| 2004/0033069 | A1 | | 2/2004 | Atkins |
| 2005/0235909 | A1 | | 10/2005 | Jones |
| 2005/0235911 | A1 | | 10/2005 | Chambers et al. |
| 2005/0236316 | A1 | | 10/2005 | Gould et al. |

FOREIGN PATENT DOCUMENTS

EP 0719591 A2 7/1996

OTHER PUBLICATIONS

Keystone Industries, Adhesive Applicator Systems & Parts, 2001 Catalog, Front & Rear Covers, and pp. 8 and 9.

Nordson Corporation, Meltex EP25 and EP34 Hot Melt Guns, Brochure, Jul. 1993, 2 pgs.

Nordson Corporation, Series H–440 Hot Melt Guns and Modules, Brochure, Mar. 1999, 2 pgs.
Nordson Corporation, Series H200 Reduced Cavity Guns, Brochure, Jan. 1993, 2 pgs.
Thomas Kayden, Horstemeyer & Risley, LLP, Request for Ex Parte Reexamination, U.S. Appl. No. 90/010,873, filed Feb. 25, 2010.
Nordson Corporation, LV 227 Adhesive Dispensing Pneumatic Gun Brochure dated Apr. 2003.
Watlow Electric Manufacturing Company, Revolutionizing The Heater Industry Brochure dated Year 2001.
European Patent Office, Search Report in European Patent Application No. 05002560.0 dated Feb. 22, 2008.

* cited by examiner

*Primary Examiner*—Cathron C Brooks
*Assistant Examiner*—Maurice Stevens
(74) *Attorney, Agent, or Firm*—Wood, Herron Evans, L.L.P.

(57) CLAIM

We claim, the ornamental design for an intake portion of a liquid dispensing valve as shown and described.

DESCRIPTION

Figure 3:
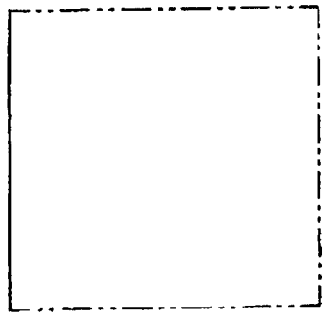
Figure 2:
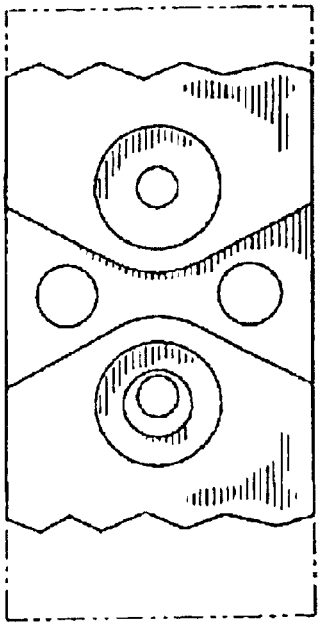
Figure 4:
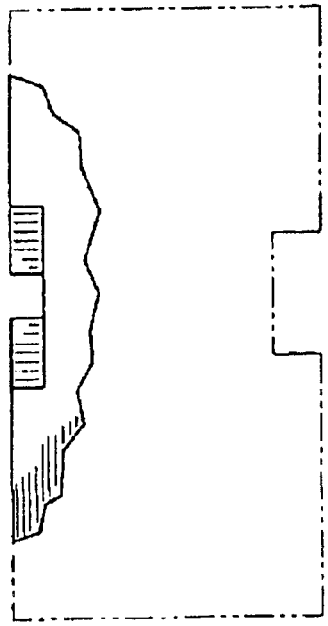

FIG. 1 is a perspective view of an intake portion of a liquid dispensing valve according to one embodiment of the invention;
FIG. 2 is a front elevational view as oriented in FIG. 1;
FIG. 3 is a top plan view;
FIG. 4 is a side elevational view of the portion of the valve of FIG. 1 wherein the opposite side is a mirror image thereof;
FIG. 5 is a perspective view of an intake portion of a liquid dispensing valve according to the second embodiment of the invention;
FIG. 6 is a front elevational view as oriented in FIG. 5;
FIG. 7 is a top plan view;
FIG. 8 is a side elevational view of the portion of the valve of FIG. 5wherein the opposite side is a mirror image thereof;
FIG. 9 is a perspective view of an intake portion of a liquid dispensing valve according to third embodiment of the invention;
FIG. 10 is a front elevational view as oriented in FIG. 9;
FIG. 11 is a top plan view;
FIG. 12 is a side elevational view of the portion of the valve of FIG. 9 wherein the opposite side is a mirror image thereof;
FIG. 13 is a perspective view of an intake portion of a liquid dispensing valve according to the fourth embodiment of the invention;
FIG. 14 is a front elevational view as oriented in FIG. 13;
FIG. 15 is a top plan view;
FIG. 16 is a side elevational view of the portion of the valve of FIG. 13 wherein the opposite side is a mirror image thereof;
FIG. 17 is a perspective view of an intake portion of a liquid dispensing valve according to the fifth embodiment of the invention;
FIG. 18 is a front elevational view as oriented in FIG. 17;
FIG. 19 is a top plan view;
FIG. 20 is a side elevational view of the portion of the valve of FIG. 17 wherein the opposite side is a mirror image thereof;
FIG. 21 is a perspective view of an intake portion of a liquid dispensing valve according to the sixth embodiment of the invention;
FIG. 22 is a front elevational view as oriented in FIG. 21;
FIG. 23 is a top plan view;
FIG. 24 is a side elevational view of the portion of the valve of FIG. 21 wherein the opposite side is a mirror image thereof;
FIG. 25 is a perspective view of an intake portion of a liquid dispensing valve according to the seventh embodiment of the invention;
FIG. 26 is a front elevational view as oriented in FIG. 25;
FIG. 27 is a top plan view;
FIG. 28 is a side elevational view of the portion of the valve of FIG. 25 wherein the opposite side is a mirror image thereof;
FIG. 29 is a perspective view of an intake portion of a liquid dispensing valve according to the eigth embodiment of the invention;
FIG. 30 is a front elevational view as oriented in FIG. 29;
FIG. 31 is a top plan view;
FIG. 32 is a side elevational view of the portion of the valve of FIG. 29 wherein the opposite side is a mirror image thereof;
FIG. 33 is a perspective view of an intake portion of a liquid dispensing valve according to the ninth embodiment of the invention;
FIG. 34 is a front elevational view as oriented in FIG. 33;
FIG. 35 is a top plan view;
FIG. 36 is a side elevational view of the portion of the valve of FIG. 33 wherein the opposite side is a mirror image thereof;
FIG. 37 is a perspective view of an intake portion of a liquid dispensing valve according to the tenth embodiment of the invention;
FIG. 38 is a front elevational view as oriented in FIG. 37;
FIG. 39 is a top plan view; and,
*FIG. 40 is a side elevational view of a portion of the valve of FIG. 37 wherein the opposite side is a mirror image thereof;*
FIG. [40] *41* is a perspective view of an intake portion of a liquid dispensing a valve according to the eleventh embodiment of the invention.
*FIG. 42 is a front elevational view as oriented in FIG. 41;*
*FIG. 43 is a top plan view; and,*
*FIG. 44 is a side elevational view of the portion of the valve of FIG. 41 wherein the opposite side is a mirror image thereof.*
The broken line showing environment is for illustrative purposes only and forms no part of the claimed design.

1 Claim, 11 Drawing Sheets

---

Matter enclosed in heavy brackets [ ] appears in the original patent but forms no part of this reissue specification; matter printed in italics indicates the additions made by reissue.

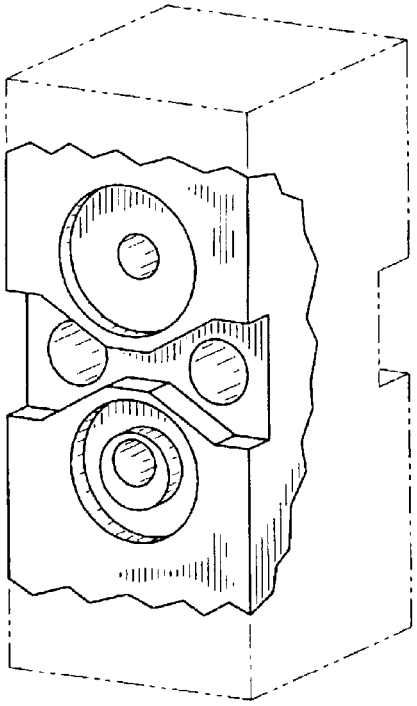
FIG. 5
AMENDED
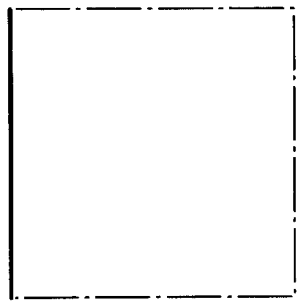
FIG. 7
AMENDED
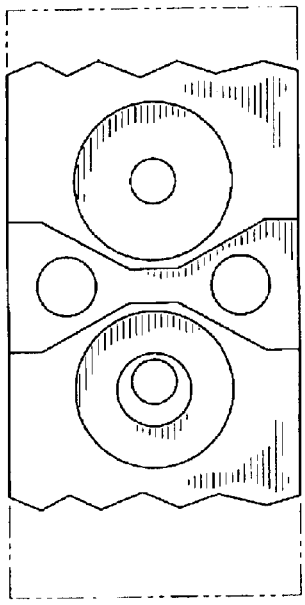
FIG. 6
AMENDED
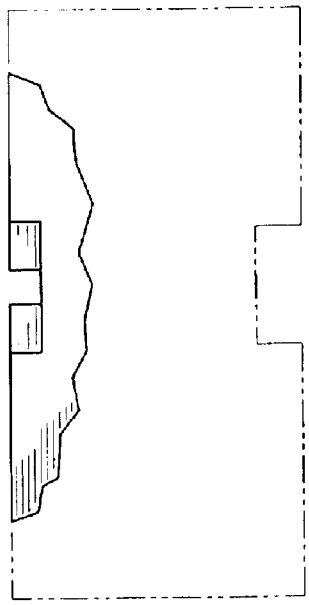
FIG. 8
AMENDED

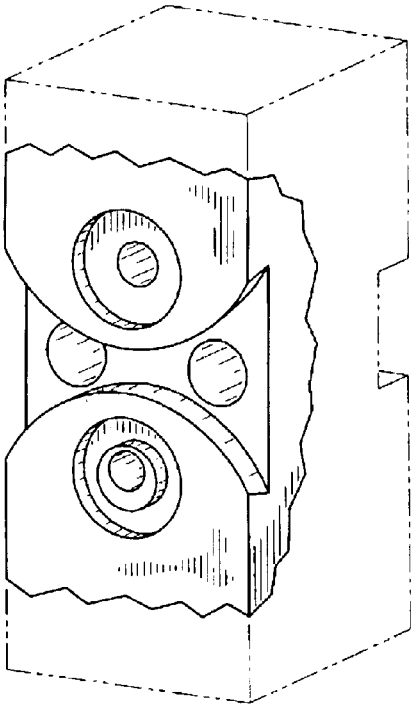
FIG. 9
AMENDED
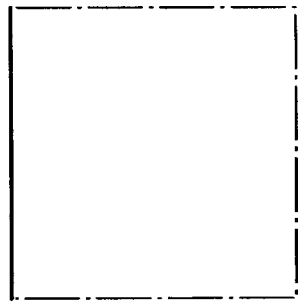
FIG. 11
AMENDED
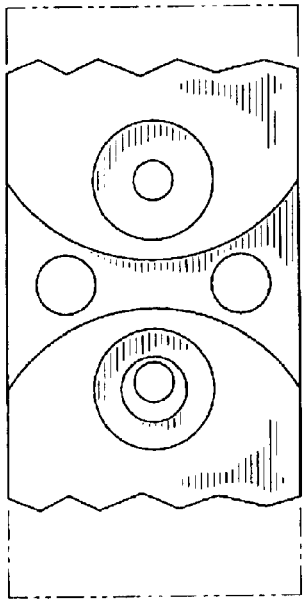
FIG. 10
AMENDED
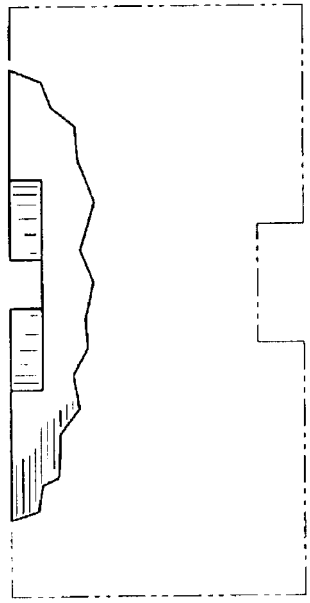
FIG. 12
AMENDED

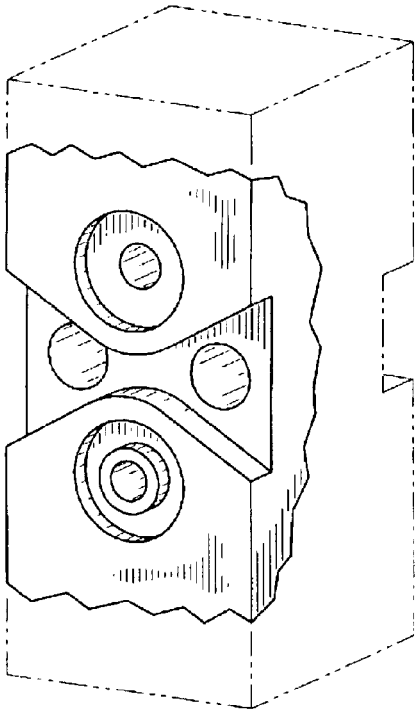
FIG. 13
AMENDED
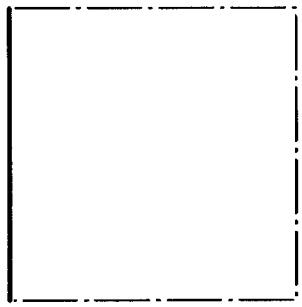
FIG. 15
AMENDED
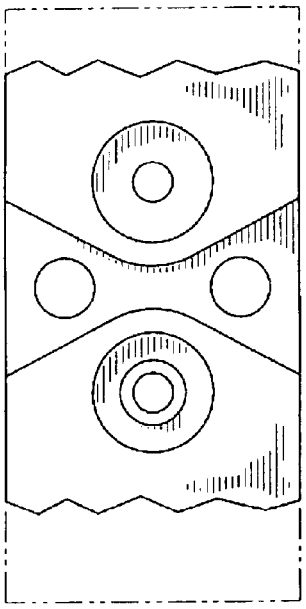
FIG. 14
AMENDED
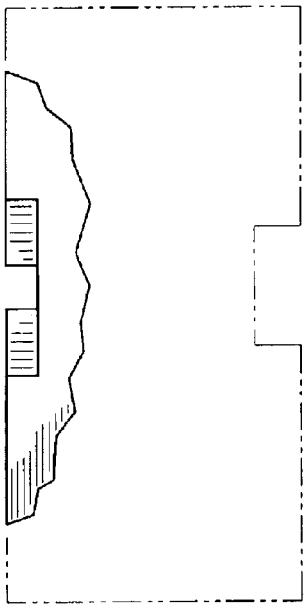
FIG. 16
AMENDED

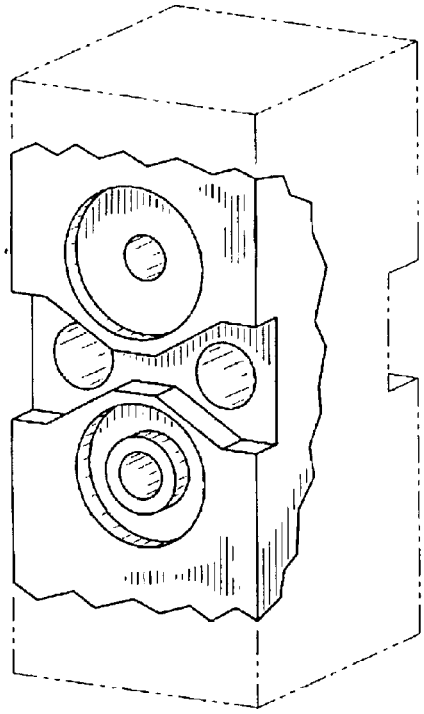
FIG. 17
AMENDED
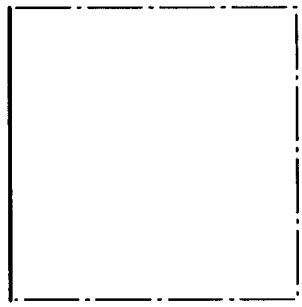
FIG. 19
AMENDED
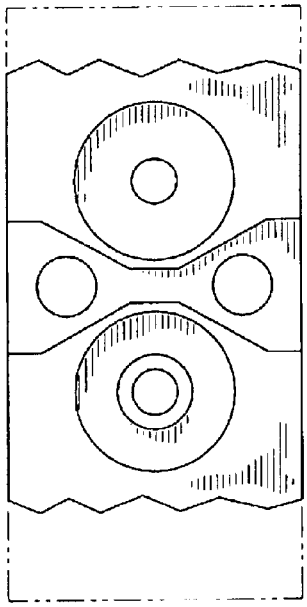
FIG. 18
AMENDED
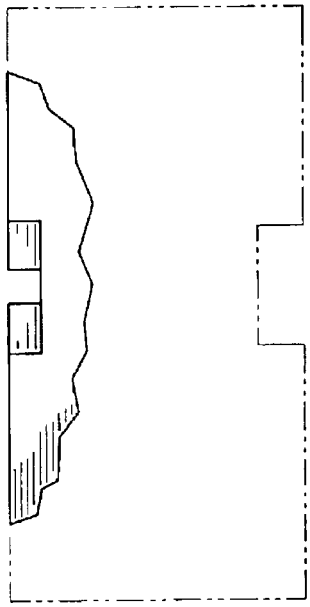
FIG. 20
AMENDED

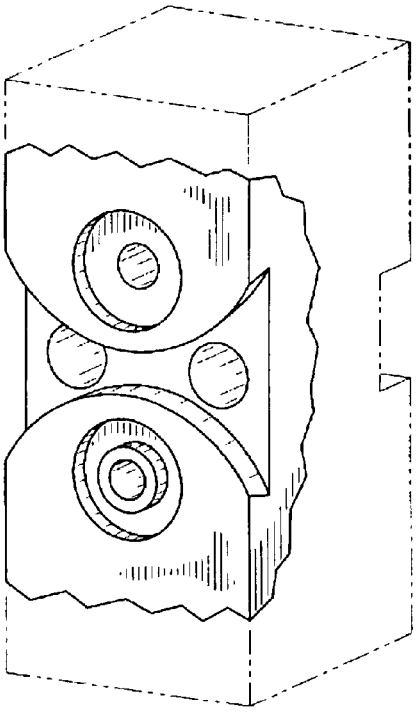
FIG. 21
AMENDED
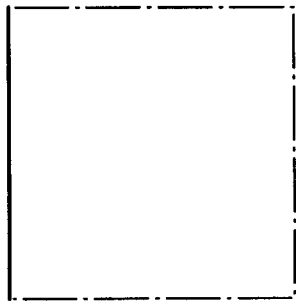
FIG. 23
AMENDED
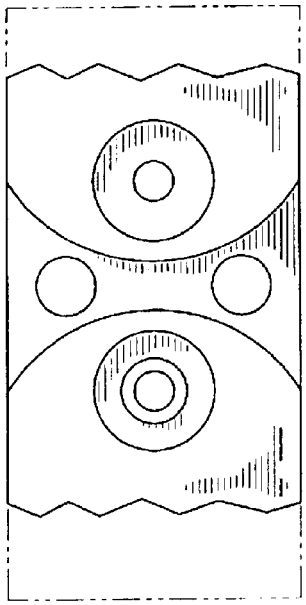
FIG. 22
AMENDED
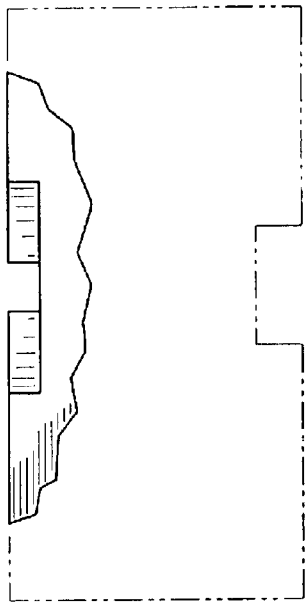
FIG. 24
AMENDED

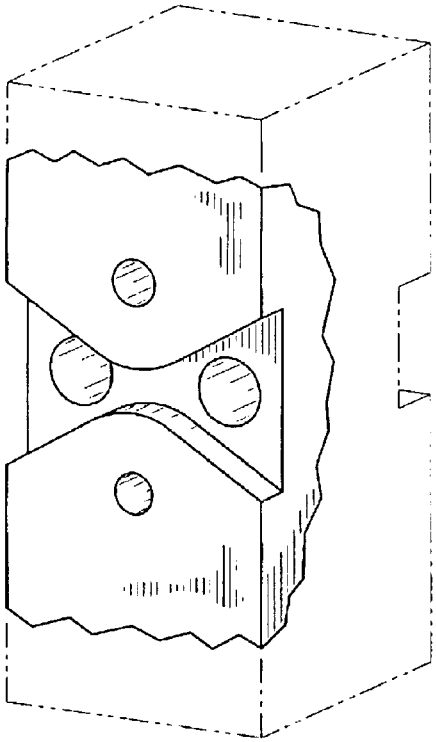
FIG. 25
AMENDED
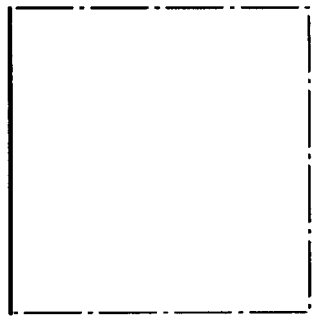
FIG. 27
AMENDED
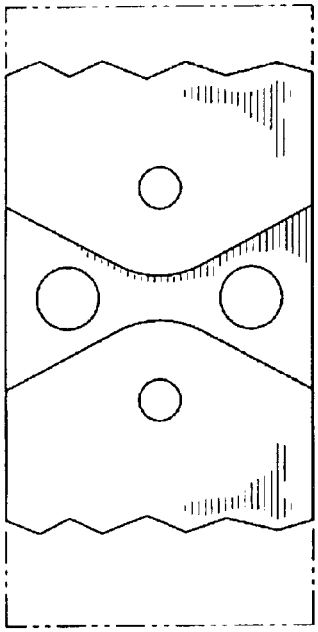
FIG. 26
AMENDED
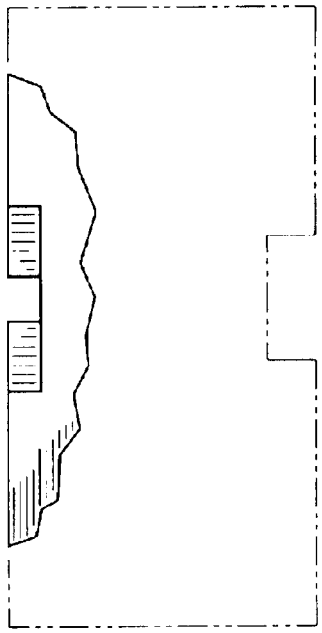
FIG. 28
AMENDED

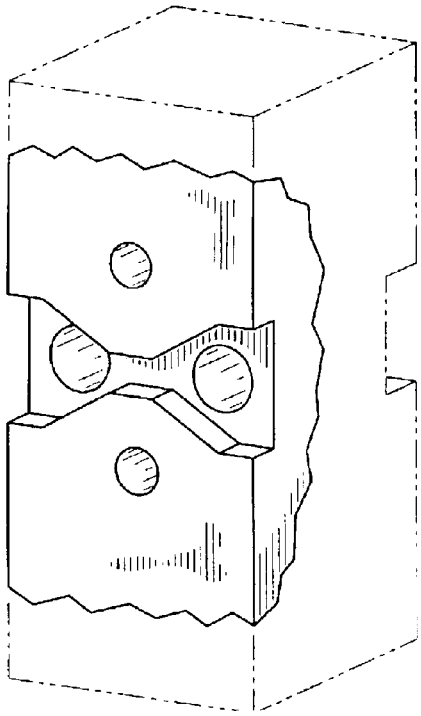
FIG. 29
AMENDED
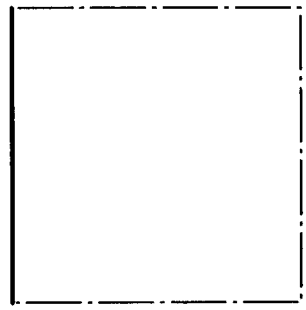
FIG. 31
AMENDED
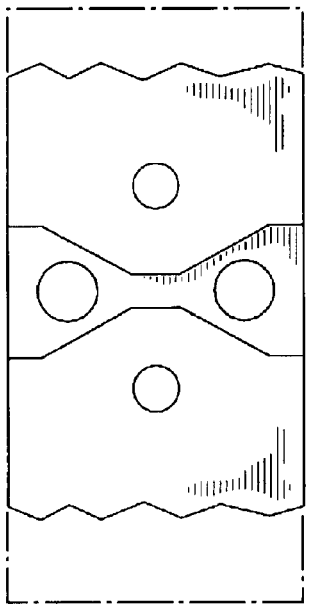
FIG. 30
AMENDED
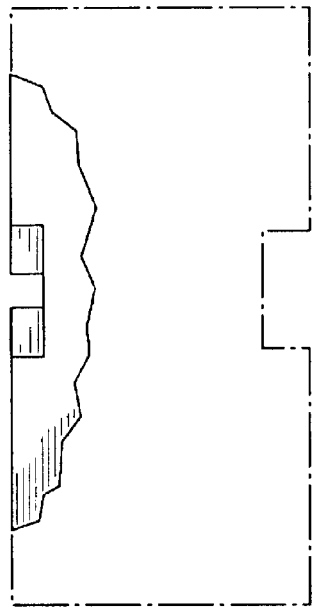
FIG. 32
AMENDED

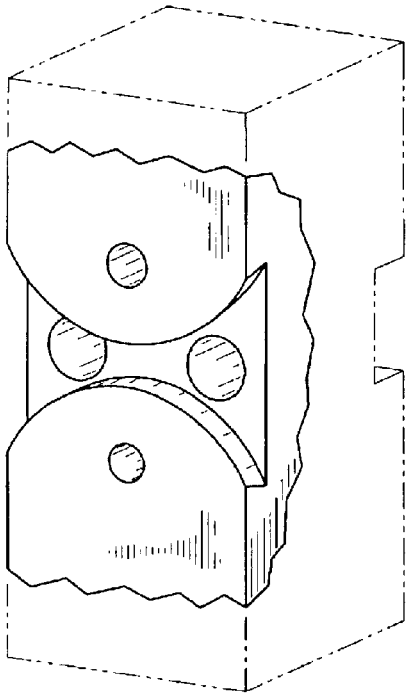
FIG. 33
AMENDED
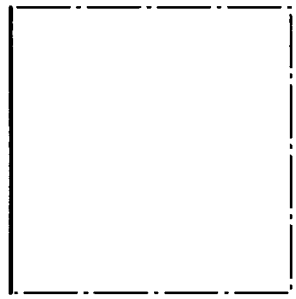
FIG. 35
AMENDED
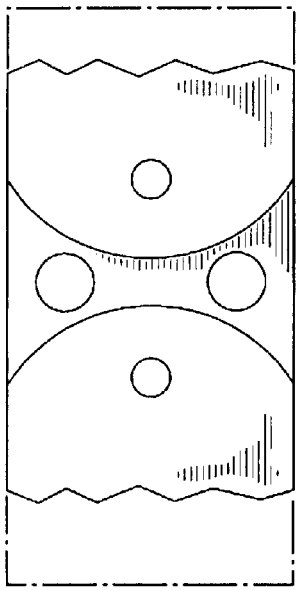
FIG. 34
AMENDED
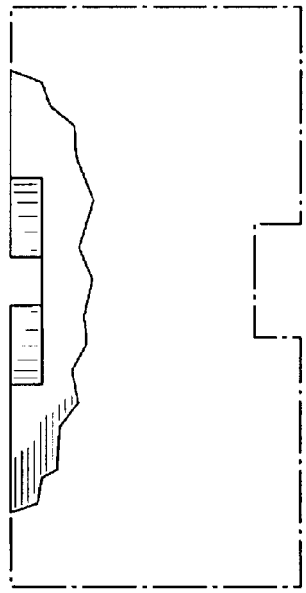
FIG. 36
AMENDED

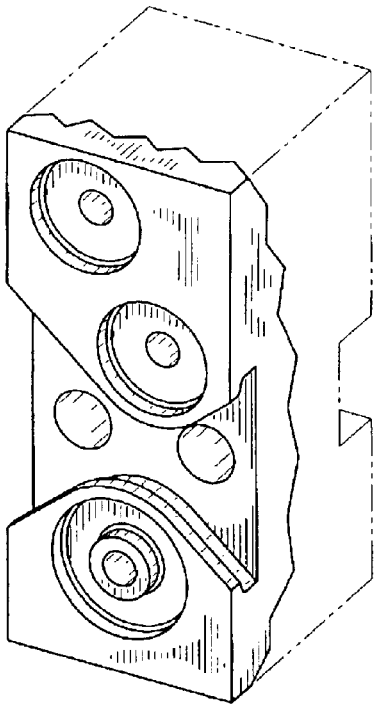
FIG. 37
AMENDED
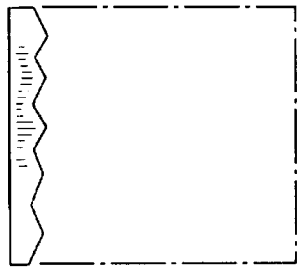
FIG. 39
AMENDED
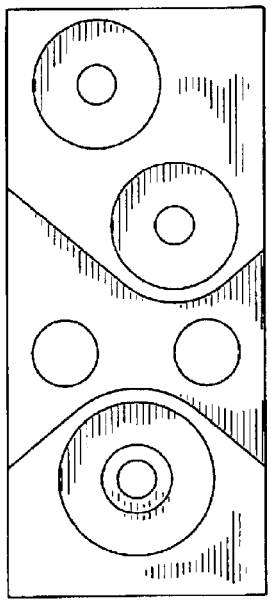
FIG. 38
AMENDED
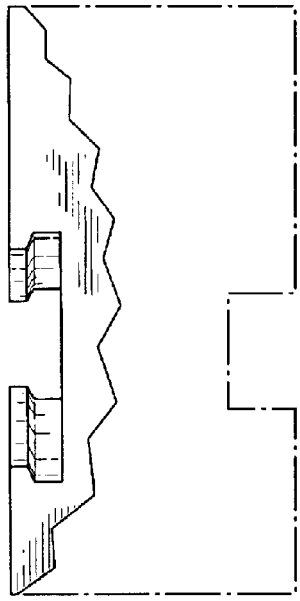
FIG. 40
AMENDED

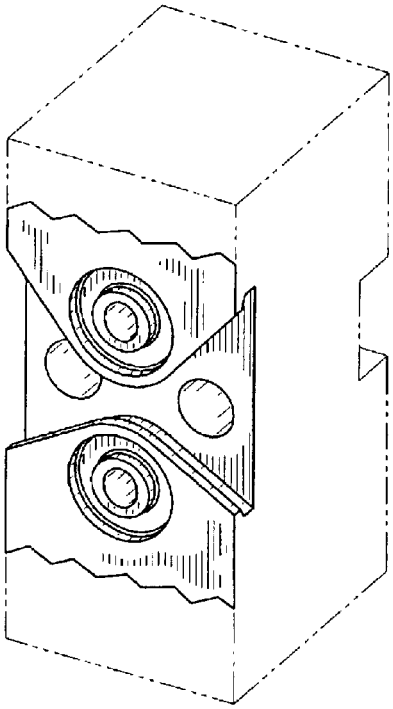
FIG. 41
NEW
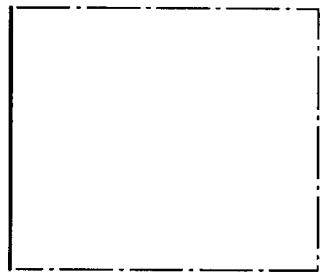
FIG. 43
NEW
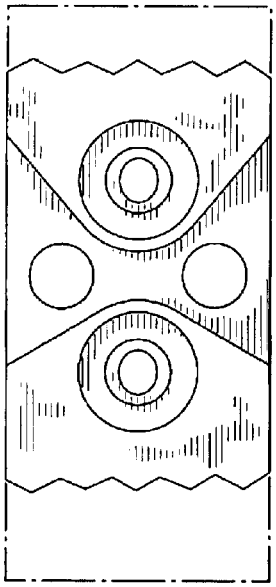
FIG. 42
NEW
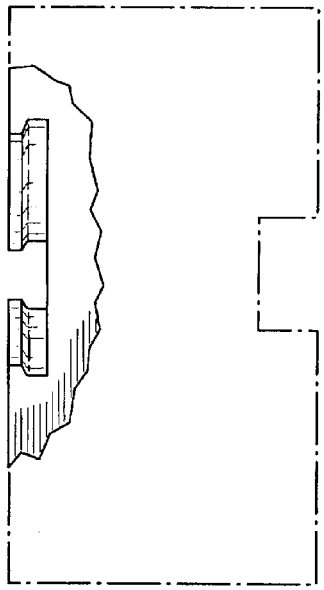
FIG. 44
NEW